April 26, 1966     S. R. HOH     3,248,577

THERMIONIC ENERGY CONVERTER

Filed Nov. 4, 1960     2 Sheets-Sheet 1

INVENTOR.
SIEGFRIED R. HOH
BY Alfred C. Hill
AGENT

April 26, 1966  S. R. HOH  3,248,577
THERMIONIC ENERGY CONVERTER
Filed Nov. 4, 1960  2 Sheets-Sheet 2
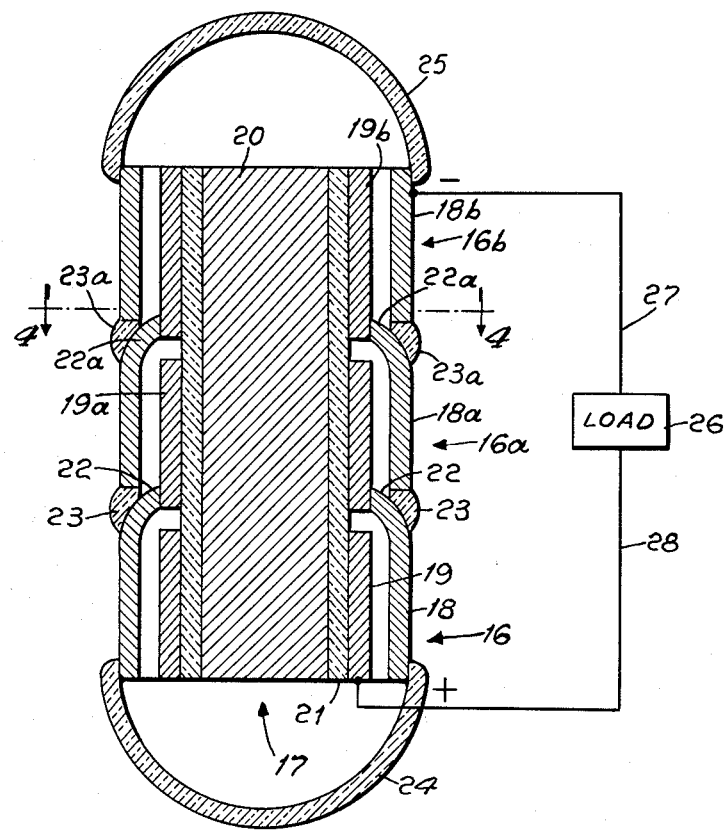
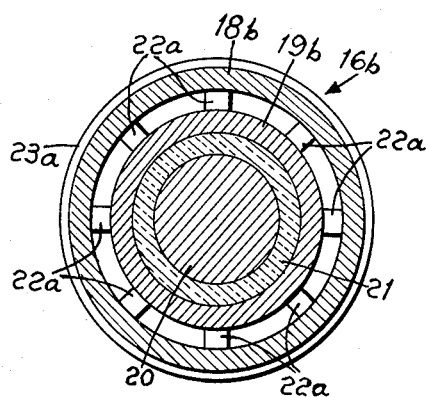
INVENTOR.
SIEGFRIED R. HOH
BY Alfred C. Hill
AGENT

United States Patent Office 3,248,577
Patented Apr. 26, 1966

3,248,577
THERMIONIC ENERGY CONVERTER
Siegfried R. Hoh, Belleville, N.J., assignor to International Telephone and Telegraph Corporation, Nutley, N.J., a corporation of Maryland
Filed Nov. 4, 1960, Ser. No. 67,311
6 Claims. (Cl. 310—4)

This invention relates to thermionic energy converters and more particularly to an improved multistage thermionic energy converter.

A thermionic energy converter is a device which converts heat energy directly into electrical energy by utilizing thermionic emission. Basically it consists of a thermionic emissive electrode emitting electrons to a collector electrode whose Fermi level is lower than that of the emissive electrode. Useful electrical power is obtained by connecting a resistive load between the emissive electrode and collector electrode. To yield significant power output, it is required that: (1) the collector electrode be composed of a low work function material; (2) the space charge between the thermionic emissive electrode and collector be prevented or compensated for by close spacing between the emissive electrode and collector, or the presence of an ionized gas therebetween; and (3) a sufficient temperature difference exists between the emissive electrode and collector.

To increase the amount of power output from thermionic energy converters it has been proposed to provide a plurality of diodes of the type described above interconnected by wires in a manner to additively combine the resultant electrical power of each of the diodes. The efficiency of electrical power production for such an arrangement depends upon (1) heat removal from the collector electrode to maintain the collector electrode at a temperature lower than the emissive electrode, (2) maintaining the ratio of the emissive electrode area to the area upon which the thermal energy impinges, as high as possible, and (3) reducing the resistance of the interconnecting wires to a sufficiently low value to prevent the consumption of power in these wires but yet withstand the operating temperatures of the converter. In prior art devices wherein each diode is packaged in an individual vacuum envelope and mounted upon a support to permit the incident thermal energy to act upon the emissive electrodes, it has been found that the ratio of emissive electrode area to overall assembly area has been in the order of 50%. Furthermore, thermal radiation not impinging upon the emissive electrodes must be removed from the supporting structure to prevent the heating up of the collectors to prevent a further decrease in the overall efficiency. The resistance of the interconnecting wire without burning up at the operating temperatures of the converter, such as tungsten wires, acts to reduce the efficiency due to the consumption of power in these interconnecting wires.

Therefore, an object of this invention is to provide an improved thermionic energy converter having an increased efficiency and voltage with respect to heretofore known thermionic energy converters.

Another object of this invention is to adapt the principles of the thermionic energy converter described herein for the conversion of solar energy or nuclear energy to electrical energy.

In accordance with the principles of this invention, the thermionic energy converter includes a plurality of pairs of electrodes in the form of concentric surfaces of revolution with one electrode of each of the pairs of electrodes being placed in electrical and thermal contact with one of the electrodes of an adjacent one of the pairs of electrodes to additively combine the thermionic energy conversion and, thus, increase the voltage output of each of the pairs of electrodes. More specifically, a plurality of diodes each including an emissive electrode and a collector electrode are disposed relative to each other to place at least a portion of an edge of the collector electrode in contact with the emissive electrode of the adjacent diode with at least a portion of an edge of the collector electrodes of his latter diode being placed in contact with the emissive electrode of the next adjacent diode. When utilized to convert solar energy into electrical energy the electrodes are in the form of concentric conical frustums while when converting nuclear energy to electrical energy the electrodes are in the form of concentric cylinders.

The above-mentioned and other features and objects of this invention will become more apparent by reference to the following description taken in conjunction with the accompanying drawings, in which:

FIG. 3 is a cross-sectional view of a thermionic energy converter for converting nuclear energy to electrical energy following the principles of this invention; and FIG. 4 is a cross-sectional view taken along lines 4—4 of FIG. 3.

Figure 1:
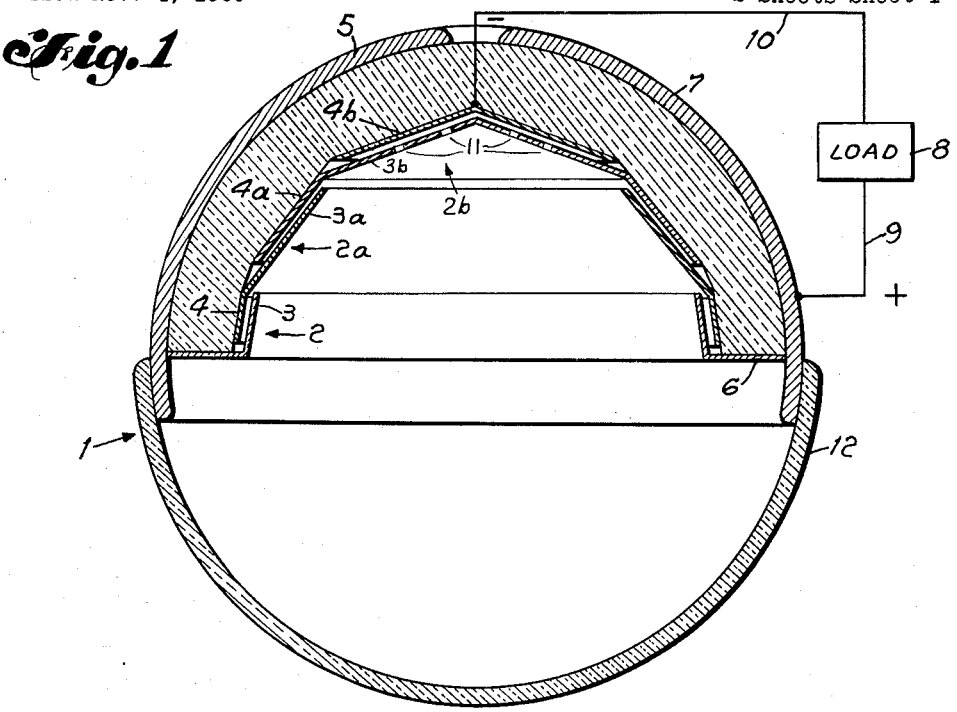
FIG. 1 is a cross-sectional diagram illustrating a thermionic energy converter following the principles of this invention.

Referring to FIG. 1, it is illustrated that the thermionic energy converter 1 of this invention consists of a plurality of pairs of electrodes 2 coacting to provide thermionic energy conversion. Each of the pairs of electrodes 2 includes an emissive electrode, or emitter 3, consisting of a suitable material having a high melting point, such as tungsten or thoriated tungsten, and a collector electrode, or collector 4, having a relatively low work function, such as a suitable metal coated with barium. Each of the pairs of electrodes 2 is disposed relative to each other to couple thermally and electrically one electrode of each of the pairs of electrodes 2 to one electrode of an adjacent one of the pairs of electrodes 2 to additively combine the thermionic energy conversion of each of the pairs of electrodes 2. More specifically, in accordance with the illustration of FIG. 1, the pairs of electrodes 2 are concentric surfaces of revolution illustrated to be conical frustums, or conical rings, with the edge of collector 4 of electrodes 2 placed in contact with an adjacent edge of emitter 3a of electrodes 2a which in turn has collector 4a disposed to have an edge placed in contact with emitter 3b of electrodes 2b. It will be observed that emitters 3, 3a and 3b completely shield collectors 4, 4a and 4b and overlap and are coextensive with the surface of thermally conducting dielectric material 5, such as beryllium oxide to aid in heat removal, so that any thermal energy intercepted by converter 1 will be impinged upon emitters 3, 3a and 3b, only. Thus, emitters 3, 3a and 3b will receive 100% of the thermal energy intercepted by converter 1. Thus, there is no impinging thermal energy to be removed by material 5, only the heat radiated from the emitter electrodes to the collector electrodes. The emitter activated by the thermal energy will release electrons for flow to its associated collector with the pairs of electrodes being coupled in series relationship without benefit of a resistive wire but rather by benefit of forming the collector of one pair of electrodes to be integral with the emitter of the next adjacent pair of electrodes, thereby eliminating power loss heretofore experienced in the resistive wire connections between diodes of a multistage thermionic energy converter.

Dielectric material 5 besides provides a supporting surface for both the emitter and collector of each of the pair of electrodes with emissive electrode 3 being directly supported from material 5 by flange 6 while emitters 3a and 3b are supported by virtue of their physical, electrical and thermal connection to collectors 4 and 4a, respectively. Collectors 4 and 4a are in turn secured to one surface of material 5 by known ceramic to metal brazing techniques. A metallic, thermally conducting material 7 to aid in the removal of heat from collector electrodes 4, 4a and 4b and material 5 is similarly secured to the other surface of material 5 and flange 6.

To obtain the useful electrical power, an external circuit including a resistive load 8 is connected to material 7 and, hence, to emitter 3, the emitter of the first of the pairs of electrodes, and to collector 4b, the collector of the last of the pairs of electrodes, by electrical conducting means, such as wires 9 and 10, respectively. As illustrated, wire 10 is brought out through material 5 and through an aperture in member 7 with the aperture being maintained in a sealed condition either by material 5 if wire 10 is imbedded therein, or by plugging the aperture in member 7 with suitable dielectric material.

To prevent or reduce the space charge between the emitter and collector of each pair of electrodes, the emitter and collector are closely spaced, that is, in the order of less than 0.001 inch. In addition to or in place of the close spacing of the emitter and collector, a gaseous vapor may be introduced into the interelectrode region, such as cesium vapor, to produce a sufficient number of positive ions to neutralize the electrons present in the space charge in the interelectrode region. It will be appreciated that the ionized gas cannot obtain access to the interelectrode space between emitter 3b and collector 4b without providing apertures in emitter 3b. Thus, there is provided in emitter 3b a plurality of apertures 11 to provide a passageway for the ionized gas to the interelectrode space between electrodes 3b and 4b. To maintain the gaseous vapor in the interelectrode spacing and to maintain the pairs of electrodes or diodes in a vacuum condition or at least in a low pressure condition to permit thermionic emission, a light transparent member 12, such as high temperature glass, having a semi-spherical configuration is hermetically sealed to member 7 to maintain the desired atmospheric condition in the vicinity of electrodes 2, 2a and 2b and also to permit incident thermal energy in the form of solar energy to enter this hermetically sealed assembly for thermionic energy conversion.

Figure 2:
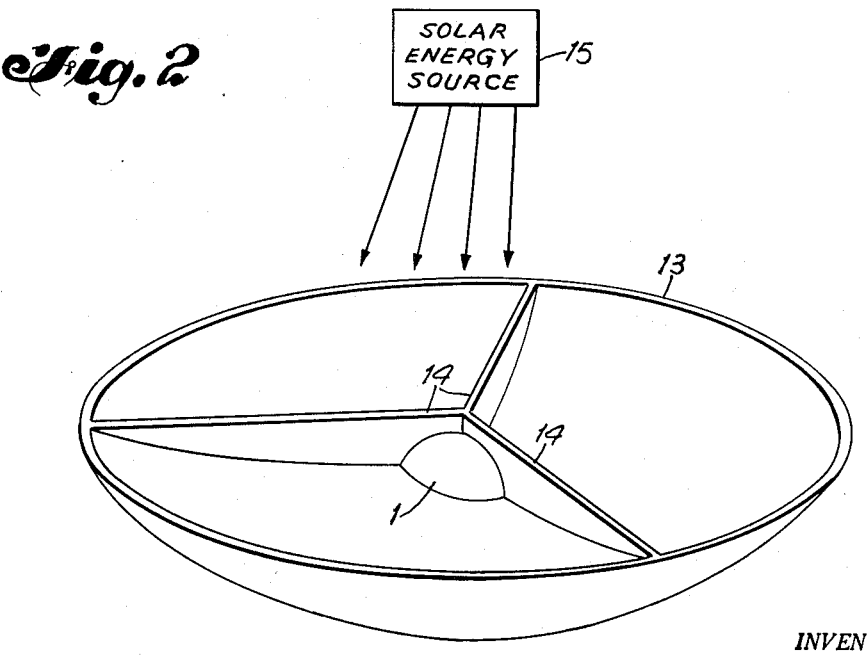
FIG. 2 is a perspective view of the thermionic energy converter of FIG. 1 utilized to convert solar energy to electrical energy.

Referring to FIG. 2, there is illustrated therein a converter 1 having the configuration illustrated in FIG. 1 supported at the focal point, or closely adjacent to the focal point, of a parabolic type mirror 13 by means of fins 14. Mirror 13 collects the solar energy from source 15, such as our sun, which then will act to focus this solar energy upon the electron emitting electrode of the pairs of electrodes contained in converter 1. Fins 14 not only act to support converter 1 in the appropriate relationship to mirror 13, but also act to cooperate with metallic member 7 and material 5 to cool the collector electrode by virtue of the fact that being fastened thermally and physically to member 7 heat generated in the collectors is radiated off fins 14. The combined unit of FIG. 2 could of course be located at a ground installation or could be attached to a satellite orbiting in space. In the latter application, it of course would be preferable that the materials employed in the assembly be as light as possible. Thus, mirror 13 would preferably consist of a very light material, such as reinforced plastic having a silvered mirror surface appropriately fastened thereto.

Referring to FIGS. 3 and 4, there is illustrated therein a thermionic energy converter following the principles of this invention as set forth hereinabove with respect to FIG. 1 capable of converting nuclear energy to electrical energy. In accordance with the illustration of FIGS. 3 and 4, the pairs of electrodes 16 in the form of concentric surfaces of revolution are disposed to be coaxial of the source of nuclear energy 17. More specifically, electrodes 16 include a cylindrical collector or collector electrode 18 and a cylindrical emitter or emissive electrode 19 concentric with collector 18 disposed coaxially about rod 20 of nuclear material, such as uranium. Intermediate emitter 19 and rod 20 is disposed a cylindrical insulating material 21, such as beryllium oxide. The purpose of this material is to electrically insulate emitters 19, 19a and 19b from each other. Thus, when the thermal energy from rod 20 impinges upon the emitters 19, 19a and 19b, thermionic emission takes place with the emitted electrons being collected by collectors 18, 18a and 18b. To carry out the features of this invention, namely, the connecting of the collector of one pair of electrodes to the emitter of the next adjacent pair of electrodes directly without an intervening resistive wire, collectors 18, 18a and 18b are provided with re-entrant or bent-in fingers 22 to thereby enable at least portions of the edge of the collector of one pair of electrodes to make contact with the adjacent edge of the emitter of the next adjacent pair of electrodes. These fingers may be formed by appropriately crimping collector 18 and bending in portions thereof to form the desired connections, or they may be attachments fastened to the collectors to provide the desired connection between the pairs of electrodes.

To provide a hermetically sealed unit, collectors 18, 18a and 18b are electrically insulated one from the other by dielectric members 23 and 23a, with the edges of members 23 and 23a being hermetically sealed to collectors 18, 18a and 18b. The vacuum enclosure is completed by providing the bulbous ends 24 and 25 which are hermetically sealed to an external edge of collectors 18 and 18b, respectively.

To utilize the converted electrical energy, resistive load 26 is connected to collector 18b and to emitter 19 as illustrated by means of wires 27 and 28, respectively. Wire 28 is brought through bulbous end 24 in an hermetically sealed fashion to maintain the desired vacuum seal of the pairs of electrodes.

To compensate for or eliminate the space charge built up between the collectors 18 and emitters 19, these electrodes are spaced relatively close together, in the order of 0.001 inch or less, or as pointed out hereinabove cesium vapor is provided in the vacuum enclosed assembly. When cesium vapor is placed within the vacuum envelope there is a dual function performed. As before the space charge problem is eliminated or reduced and in addition a cesium coating will be provided upon the collectors to effectively lower the work function thereof. Thus, the low work function requirement for efficient thermionic energy converter operation is enhanced.

While I have described above the principles of my invention in connection with specific apparatus, it is to be clearly understood that this description is made only by way of example and not as a limitation to the scope of my invention as set forth in the objects thereof and in the accompanying claims.

I claim:

1. A thermionic energy converter comprising a plurality of concentric pairs of electrodes in the form of hollow frustums, each of said pairs of electrodes coacting to provide thermionic energy conversion, said pairs of electrodes being disposed in a tandem relationship with respect to each other to place an edge of one electrode of each of said pairs of electrodes in contact with the edge of the other electrode of an adjacent one of said pairs of electrodes to additively combine the thermionic energy conversion of each of said pairs of electrodes.

2. A thermionic energy converter comprising a plurality of concentric pairs of electrodes in the form of conical rings, each of said pairs of electrodes coacting to provide thermionic energy conversion, said pairs of electrodes being disposed in a tandem relationship with respect to each other to place an edge of one electrode of each of said pairs of electrodes in contact with an edge of the other electrode of an adjacent one of said pairs of electrodes to additively combine the thermionic energy conversion of each of said pairs of electrodes.

3. A thermionic energy converter comprising means for collecting solar energy and a plurality of concentric pairs of electrodes in the form of hollow frustums, each of said pairs of electrodes including a thermionic emissive electrode and a collector electrode coacting to provide energy conversion, said emissive electrode of each of said pairs of electrodes being in communication with said energy collecting means, each of said pairs of electrodes being disposed relative to each other to place an edge of said collector electrode of each of said pairs of electrodes in contact with an adjacent edge of said emissive electrode of adjacent ones of said pairs of electrodes to additively combine the thermionic energy conversion of each of said pairs of electrodes.

4. A thermionic energy converter comprising means for collecting solar energy and a plurality of concentric pairs of electrodes in the form of conical rings, each of said pairs of electrodes including a thermionic emissive electrode and a collector electrode coacting to provide thermionic energy conversion, said emissive electrode of each of said pairs of electrodes being in communication with said energy collecting means, each of said pairs of electrodes being disposed relative to each other to place an edge of said collector electrode of each of said pairs of electrodes to an adjacent edge of said emissive electrode of an adjacent one of said pairs of electrodes to additively combine the thermionic energy conversion of each of said pairs of electrodes.

5. A thermionic energy converter comprising a plurality of concentric pairs of electrodes in the form of hollow frustums, each of said pairs of electrodes including a thermionic emissive electrode and a collector electrode coacting to provide thermionic energy conversion, each of said pairs of electrodes being disposed in a tandem relationship with respect to each other to place said collector electrode of each of said pairs of electrodes except the last of said pairs of electrodes in contact with an adjacent edge of said emissive electrode of adjacent ones of said pairs of electrodes except the first of said pairs of electrodes to additively combine the thermionic conversion of each of said pairs of electrodes, a source of solar energy, means to direct said solar energy for communication with said emissive electrode of each of said pairs of electrodes, and a resistive load coupled to said emissive electrode of said first pair of electrodes and said collector electrode of said last pair of electrodes.

6. A thermionic energy converter comprising a source of energy, means for directing energy to a given focal point, a plurality of pairs of electrodes, each of said pairs of electrodes including a thermionic emissive electrode and a collector electrode, said thermionic emissive electrodes being arranged around said focal point in unobstructed exposure to energy from said focal point, said thermionic emissive electrodes being positioned between said focal point and said collector electrodes and shielding said collector electrodes from direct impingement of energy from said focal point, a common heat conducting, electrically insulating, sink in physical contact with each of said collector electrodes along one entire face of each of said collector electrodes, each of the electrodes intermediate the end electrodes merging and forming a common edge with an adjacent electrode.

References Cited by the Examiner
UNITED STATES PATENTS

| | | |
|---|---|---|
| 787,145 | 4/1905 | Brown. |
| 2,161,859 | 6/1939 | Geffeken _____ 313—102 X |
| 2,510,397 | 6/1950 | Hansell _____ 310—4 |
| 2,517,120 | 8/1950 | Linder _____ 313—1 |
| 2,863,074 | 12/1958 | Johnstone _____ 310—4 |
| 2,937,301 | 5/1960 | Germeshausen _____ 313—212 |
| 3,021,472 | 2/1962 | Hernquist _____ 310—4 X |
| 3,070,643 | 12/1962 | Toulmin _____ 310—4 |
| 3,113,091 | 12/1965 | Rasor _____ 310—4 X |

FOREIGN PATENTS

| | | |
|---|---|---|
| 627,049 | 5/1927 | France. |
| 797,872 | 7/1958 | Great Britain. |

ORIS L. RADER, *Primary Examiner.*

MILTON O. HIRSHFIELD, DAVID X. SLINEY,
*Examiners.*

J. A. HINKLE, *Assistant Examiner.*